US012761700B2

(12) United States Patent
Koo et al.

(10) Patent No.: US 12,761,700 B2
(45) Date of Patent: Oct. 13, 2026

(54) ELECTRONIC DEVICE INCLUDING FASTENING MEMBER

(71) Applicant: Samsung Electronics Co., Ltd., Suwon-si (KR)

(72) Inventors: Younggwon Koo, Suwon-si (KR); Youngshin Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 606 days.

(21) Appl. No.: 18/186,362

(22) Filed: Mar. 20, 2023

(65) Prior Publication Data

US 2023/0288968 A1 Sep. 14, 2023

Related U.S. Application Data

(63) Continuation of application No. PCT/KR2023/001589, filed on Feb. 3, 2023.

(30) Foreign Application Priority Data

Mar. 10, 2022 (KR) ........................ 10-2022-0029875
Apr. 26, 2022 (KR) ........................ 10-2022-0051229

(51) Int. Cl.
*G06F 1/16* (2006.01)

(52) U.S. Cl.
CPC .......... *G06F 1/1681* (2013.01); *G06F 1/1679* (2013.01)

(58) Field of Classification Search
CPC ............................. G06F 1/1679; G06F 1/1681
See application file for complete search history.

(56) References Cited

U.S. PATENT DOCUMENTS

2015/0017828 A1* 1/2015 Li ........................... G06F 1/186
439/345
2016/0282903 A1 9/2016 Lan
(Continued)

FOREIGN PATENT DOCUMENTS

JP 4791235 B2 10/2011
JP 6212522 B2 10/2017
(Continued)

OTHER PUBLICATIONS

International Search Report dated May 8, 2023, issued in International Application No. PCT/KR2023/001589.

*Primary Examiner* — Imani N Hayman
(74) *Attorney, Agent, or Firm* — Jefferson IP Law, LLP

(57) ABSTRACT

An electronic device is provided. The electronic device includes a first housing, a second housing rotatably connected to the first housing, a printed circuit board (PCB) arranged inside the first housing, a first fastening structure arranged in the PCB, and a second fastening structure arranged inside the rear cover to be fastened to the first fastening structure, wherein the first fastening structure includes a fixing member fixedly connected to the PCB, a rotation hook rotatably connected to the fixing member and configured to fasten to the second fastening structure, and an elastic member having a first end connected to the fixing member and a second end connected to the rotation hook, wherein the elastic member generates a torque that rotates the rotation hook relative to the fixing member in first direction or a second direction based on a fastening state of the second fastening structure to the rotation hook.

20 Claims, 12 Drawing Sheets

(56) References Cited

U.S. PATENT DOCUMENTS

| | | | | |
|---|---|---|---|---|
| 2017/0164487 | A1* | 6/2017 | Kim | G06F 1/184 |
| 2017/0293326 | A1* | 10/2017 | Lin | G11B 33/128 |
| 2021/0049310 | A1* | 2/2021 | Grobelny | H04L 9/0891 |
| 2021/0157313 | A1* | 5/2021 | Graf | B62D 53/02 |

FOREIGN PATENT DOCUMENTS

| | | | |
|---|---|---|---|
| JP | 6779342 | B1 | 11/2020 |
| JP | 2021032851 | A | 3/2021 |
| KR | 10-2008-0013411 | A | 2/2008 |
| KR | 10-2012-0081645 | A | 7/2012 |
| KR | 10-2014-0142989 | A | 12/2014 |
| KR | 10-2016-0127542 | A | 11/2016 |
| WO | 2007/061183 | A1 | 5/2007 |

* cited by examiner

ELECTRONIC DEVICE INCLUDING FASTENING MEMBER

CROSS-REFERENCE TO RELATED APPLICATION(S)

This application is a continuation application, claiming priority under § 365(c) of an International application No. PCT/KR2023/001589, filed on Feb. 3, 2023, which is based on and claims the benefit of a Korean patent application number 10-2022-0029875, filed on Mar. 10, 2022, in the Korean Intellectual Property Office, and of a Korean patent application number 10-2022-0051229, filed on Apr. 26, 2022, in the Korean Intellectual Property Office, the disclosure of each of which is incorporated by reference herein in its entirety.

BACKGROUND

1. Field

The disclosure relates to an electronic device including a fastening member.

2. Description of Related Art

A personal electronic device may include a first housing connected to a display and a second housing rotatably connected to the first housing. An input device may be connected to the second housing. For example, a keyboard and/or a touch pad may be connected to the second housing.

The above information is presented as background information only to assist with an understanding of the disclosure. No determination has been made, and no assertion is made, as to whether any of the above might be applicable as prior art with regard to the disclosure.

SUMMARY

To improve portability of a personal electronic device, the thickness and the weight of an electronic device has decreased. For this, a method of decreasing the thickness of a housing of an electronic device and providing the housing with a lightweight material has been applied to the electronic device. On the other hand, when the thickness of the housing decreases or the housing is formed of a lightweight material, the rigidness of the housing may decrease, and accordingly, the housing may be easily transformed with a small force. For example, when the rigidness of a rear cover of an electronic device decreases, the rear cover may pop out or be pressed.

Aspects of the disclosure are to address at least the above-mentioned problems and/or disadvantages and to provide at least the advantages described below. Accordingly, an aspect of the disclosure is to provide an electronic device that may reduce popping out of a housing.

Additional aspects will be set forth in part in the description which follows and, in part, will be apparent from the description, or may be learned by practice of the presented embodiments.

In accordance with an aspect of the disclosure, an electronic device is provided. The electronic device includes a first housing including a front cover and a rear cover, the rear cover being configured to fasten to the front cover, a second housing connected to a display and rotatably connected to the first housing, a printed circuit board (PCB) arranged inside the first housing, a first fastening structure arranged in the PCB, and a second fastening structure arranged inside the rear cover to be fastened to the first fastening structure, wherein the first fastening structure includes a fixing member fixedly connected to the PCB, a rotation hook rotatably connected to the fixing member and configured to fasten to the second fastening structure, and an elastic member having a first end connected to the fixing member and a second end connected to the rotation hook, and wherein the elastic member generates a torque that rotates the rotation hook relative to the fixing member in a first direction or a second direction based on a fastening state of the second fastening structure to the rotation hook.

In accordance with another aspect of the disclosure, an electronic device is provided. The electronic device includes a housing including a front cover and a rear cover fastened to the front cover, a first fastening structure arranged inside the housing, and a second fastening structure arranged inside the rear cover to be fastened to the first fastening structure, wherein the first fastening structure includes a fixing member fixedly arranged inside the housing, a rotation hook rotatably connected to the fixing member and configured to fasten to the second fastening structure, and an elastic member having a first end connected to the fixing member and a second end connected to the rotation hook, and wherein the elastic member generates a torque that rotates the rotation hook relative to the fixing member in a first direction or a second direction based on a fastening state of the second fastening structure and the rotation hook.

In accordance with another aspect of the disclosure, an electronic device is provided. The electronic device includes a first housing including a front cover and a rear cover configured to fasten to the front cover, a second housing connected to a display and rotatably connected to the first housing, a PCB arranged inside the first housing, a first fastening structure arranged in the PCB, and a second fastening structure arranged inside the rear cover to be fastened to the first fastening structure, wherein the first fastening structure includes a fixing member fixedly connected to the PCB, a rotation hook rotatably connected to the fixing member and configured to fasten to the second fastening structure, and an elastic member including a first end connected to the fixing member and a second end connected to the rotation hook and configured to generate a torque that rotates the rotation hook in a first direction or a second direction relative to the fixing member based on fastening state of the second fastening structure to the rotation hook, wherein, before the second fastening structure is fastened to the rotation hook, the elastic member generates a torque in a direction in which the rotation hook presses a stopper included in the fixing member, and when the second fastening structure is fastened to the rotation hook, the elastic member generates a torque in a direction in which a fastening force between the second fastening structure and the rotation hook increases.

According to an embodiment, popping out of a housing may reduce even if the housing is thin or formed of a lightweight material.

According to an embodiment, the aesthetics of an electronic device may not deteriorate since a fastening structure is not exposed to the outside.

According to an embodiment, without being limited to a material of a housing, a fastening structure may be applied to various housings formed of various materials.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description, taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
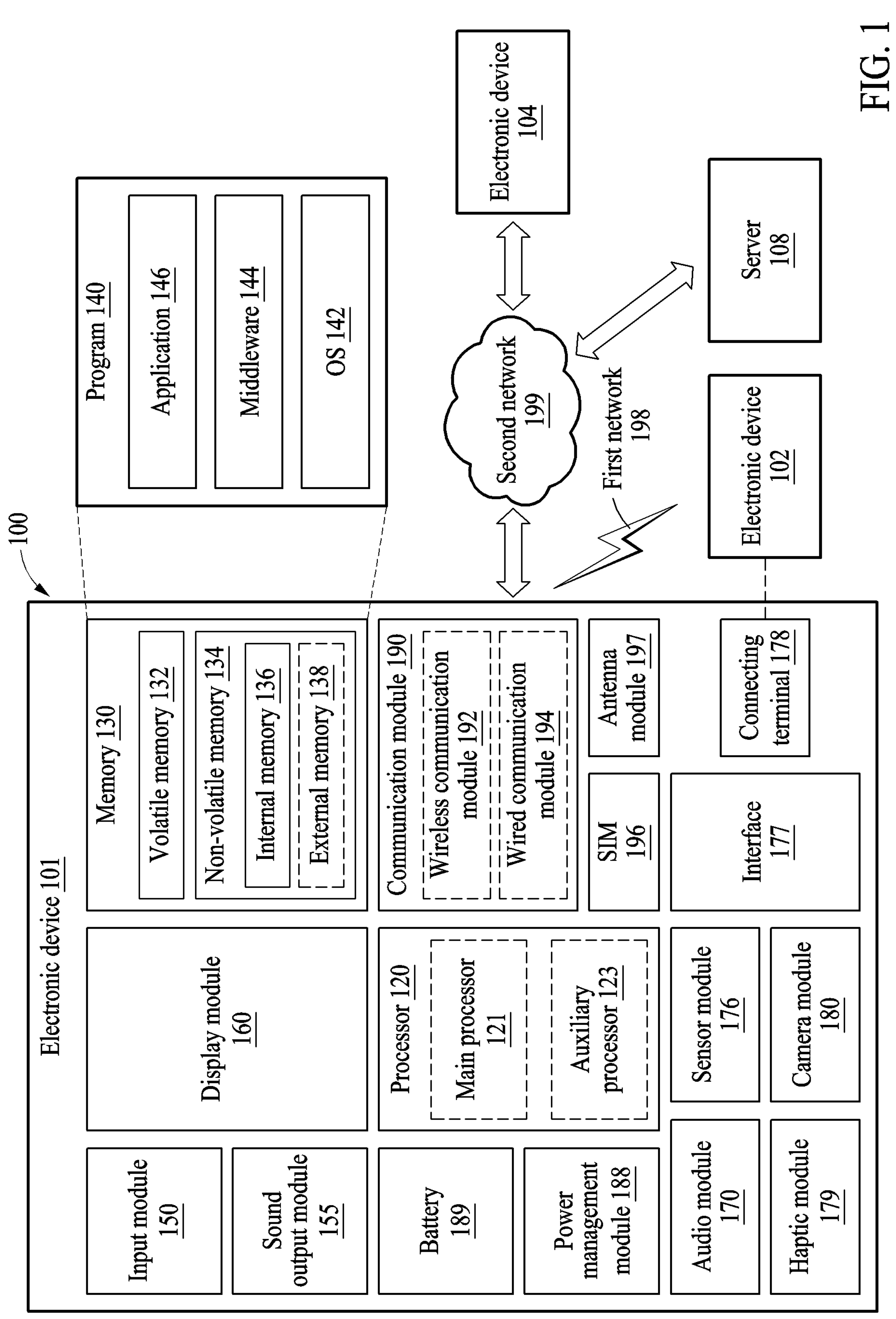
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to one embodiment, the electronic device 101 may communicate with the electronic device 104 via the server 108. According to one embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added in the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to one embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to one embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to one embodiment, the auxiliary processor 123 (e.g., an ISP or a CP) may be implemented as a portion of another component (e.g., the camera module 180 or the communication module 190) that is functionally related to the auxiliary processor 123. According to one embodiment, the auxiliary processor 123 (e.g., an NPU) may include a hardware structure specified for artificial intelligence (AI) model processing. An AI model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130 and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to one embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to one embodiment, the display module 160 may include a touch sensor adapted to sense a touch, or a pressure sensor adapted to measure an intensity of a force incurred by the touch.

The audio module 170 may convert a sound into an electric signal or vice versa. According to one embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to one embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to one embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to one embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to one embodiment, the haptic module 179 may include, for example, a motor, a piezoelectric element, or an electric stimulator.

The camera module 180 may capture a still image and moving images. According to one embodiment, the camera module 180 may include one or more lenses, image sensors, ISPs, or flashes.

The power management module 188 may manage power supplied to the electronic device 101. According to one embodiment, the power management module 188 may be implemented as, for example, at least a part of a power management integrated circuit (PMIC).

The battery 189 may supply power to at least one component of the electronic device 101. According to one embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to one embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to one embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to one embodiment, the antenna module 197 may include an antenna including a radiating element including a conductive material or a conductive pattern formed in or on a substrate (e.g., a printed circuit board (PCB)). According to one embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to one embodiment, another component (e.g., a radio frequency integrated circuit (RFIC)) other than the radiating element may be additionally formed as a part of the antenna module 197.

According to one embodiment, the antenna module 197 may form a mmWave antenna module. According to one embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to one embodiment, all or some of operations to be executed by the electronic device 101 may be executed at one or more of the external electronic devices 102 and 104, and the server 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the result, with or without further processing the result, as at least part of a response to the request. To that end, cloud computing, distributed computing, mobile edge computing (MEC), or client-server computing technology may be used, for example. The electronic device 101 may provide ultra low-latency services using, e.g., distributed computing or mobile edge computing. In one embodiment, the external electronic device 104 may include an Internet-of-things (IoT) device. The server 108 may be an intelligent server using machine learning and/or a neural network. According to one embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to embodiments may be one of various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be appreciated that various example embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via a third element.

As used in connection with embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to one embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components may be omitted, or one or more other components may be added. Alternatively or additionally, a plurality of components (e.g., modules or programs) may be integrated into a single component. In such a case, according to embodiments, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

Figure 2A:
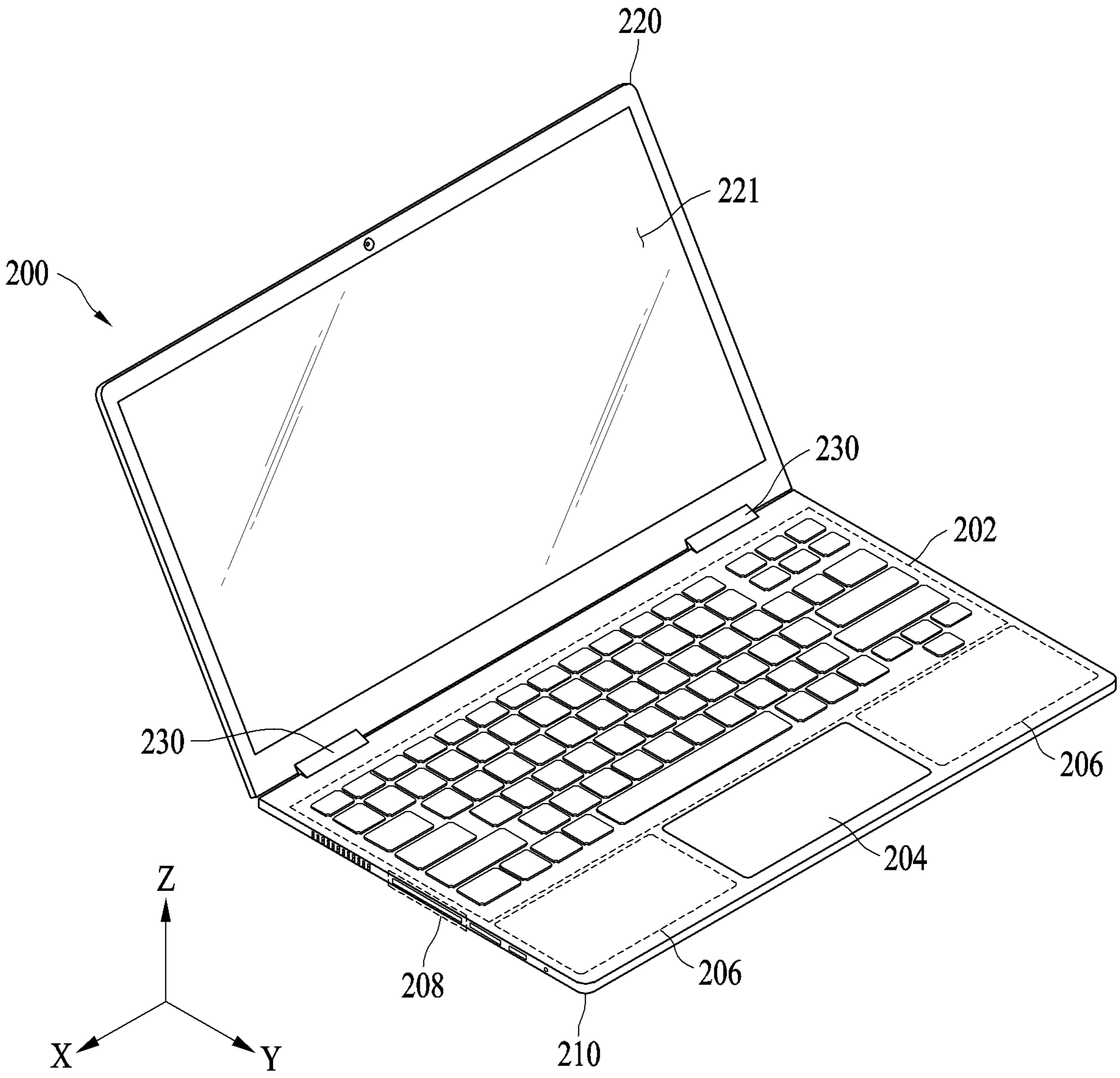
FIG. 2A is a perspective view of an electronic device according to an embodiment of the disclosure.

FIG. 2A is a perspective view of an electronic device according to an embodiment of the disclosure.

Figure 2B:
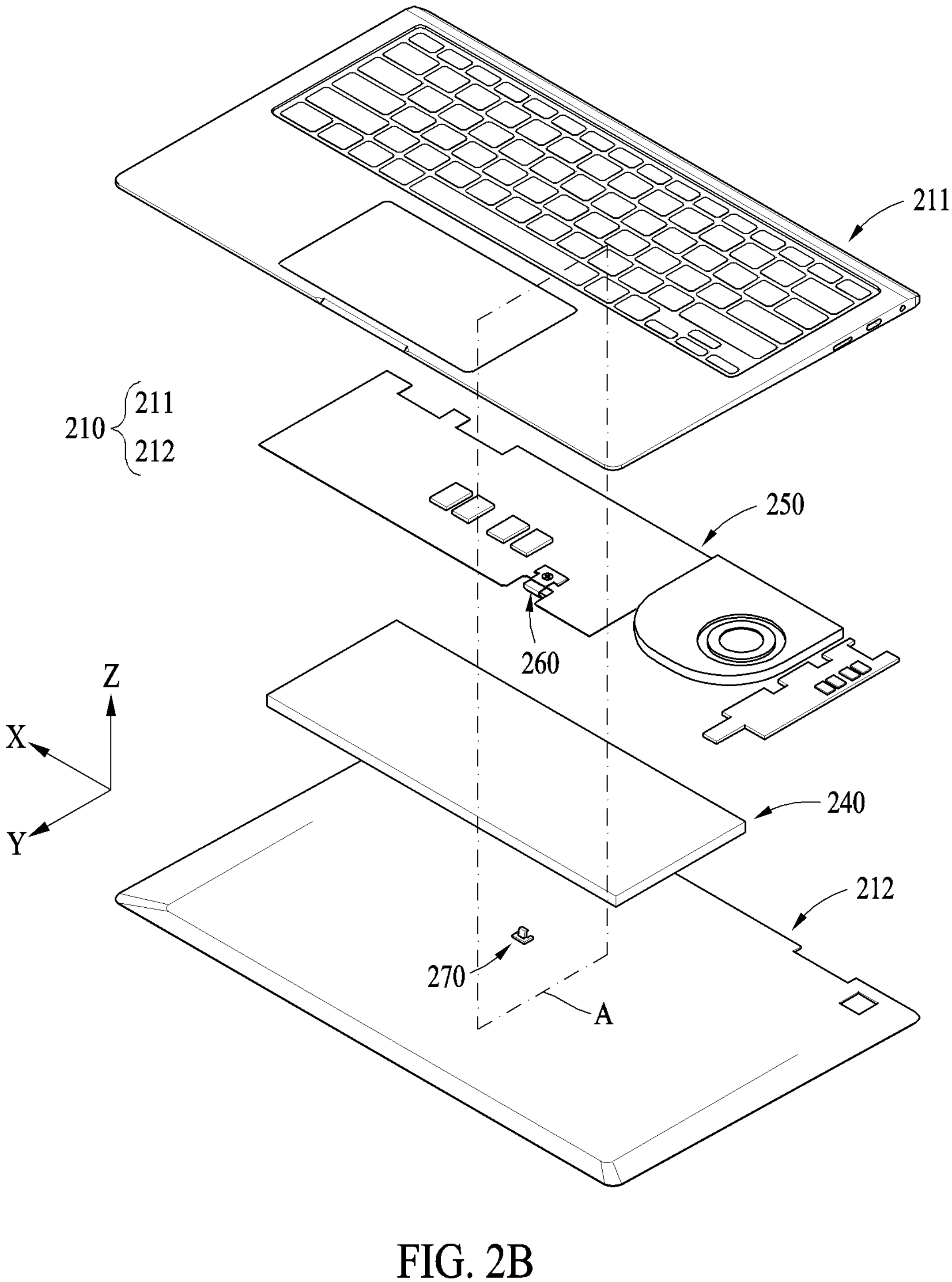
FIG. 2B is an exploded perspective view of a first housing according to an embodiment of the disclosure.

FIG. 2B is an exploded perspective view of a first housing according to an embodiment of the disclosure.

Referring to FIGS. 2A and 2B, an electronic device 200 (e.g., the electronic device 101 of FIG. 1) according to an embodiment may include a first housing 210, a second housing 220, a connector 230, a battery 240 (e.g., the battery 189 of FIG. 1), a PCB 250, a first fastening structure 260, and a second fastening structure 270.

In one embodiment, the first housing 210 may include a keyboard 202, a touchpad 204, a palm rest 206, and an antenna module 208. The keyboard 202 (e.g., the input module 150 of FIG. 1) may include a plurality of keys. The keyboard 202 may receive numeric or character information. The keyboard 202 may include a plurality of input keys and function keys for setting various functions of the electronic device 200. The function keys may include an arrow key, a volume key, and/or a shortcut key, which are set to perform a designated function. The keyboard 202 may include one of a qwerty keypad, a 3*4 keypad, a 4*3 keypad, or a touch key. The touchpad 204 may replace a function of a mouse. The touchpad 204 may input an instruction for selecting or executing an application displayed on a display 221 (e.g., the display module 160 of FIG. 1). The palm rest 206 may be a pedestal for reducing wrist fatigue of a user of the keyboard 202. The antenna module 208 (e.g., the antenna module 197 of FIG. 1) may transmit or receive a signal or power to or from an external electronic device (e.g., the electronic device 102 and 104, and/or the server 108 of FIG. 1). The first housing 210 may include at least one first electronic component. For example, the first electronic component may include the processor 120, the memory 130, and the sensor module 176 of FIG. 1 and/or other electronic components.

In one embodiment, the display 221 may be arranged in the second housing 220. The display 221 may include a screen for displaying information to be provided for a user or information input by the user by using various menus of the electronic device 200 and the keyboard 202. The screen may include at least one of a liquid crystal display (LCD), an organic light-emitting diode (OLED) display, an active-matrix organic light-emitting diode (AMOLED) display, a flexible display, or a transparent display. The screen may provide, based on use of the electronic device 200, at least one of various screens, for example, a home screen, a menu screen, a lock screen, a game screen, a webpage screen, a call screen, or a music or video play screen. The second housing 220 may include at least one second electronic component. For example, the second electronic component may include the camera module 180 and the sound output module 155 of FIG. 1 and/or other electronic components.

In one embodiment, the connector 230 may connect the first housing 210 to the second housing 220. The connector 230 may rotate the first housing 210 and the second housing 220 relative to each other. For example, the electronic device 200 may change between a closed state and an open state, in which the first housing 210 and the second housing 220 practically face each other in the closed state and one of the first housing 210 and the second housing 220 rotates with respect to the other. The connector 230 may include a hinge structure configured to mechanically connect the first housing 210 to the second housing 220. The connector 230 may electrically connect the first housing 210 to the second housing 220. For example, the connector 230 may include a flexible PCB (FPCB).

In one embodiment, the first housing 210 may include a front cover 211 and a rear cover 212. The front cover 211 may form the exterior of a front surface (e.g., the +z direction surface) of the first housing 210. For example, the keyboard 202 and/or the touchpad 204 may be arranged on the front cover 211. The rear cover 212 may form the exterior of a rear surface (e.g., the −z direction surface) of the first housing 210. The front cover 211 and/or the rear cover 212 may include plastic and/or a metal material. However, this is merely an example, and the materials of the front cover 211 and the rear cover 212 are not limited thereto.

In one embodiment, as the front cover 211 is fastened to the rear cover 212, a space where various components may be arranged may be formed inside the first housing 210. For example, the front cover 211 may be fastened to the rear cover 212 substantially along the circumference thereof to form a space therebetween. The battery 240 and the PCB 250 may be arranged in an internal space of the first housing 210. However, this is merely an example, and a component arranged in the internal space of the first housing 210 is not limited thereto.

In one embodiment, the battery 240 may supply power to at least one component of the electronic device 200. Various electronic components configured to implement a function of the electronic device 200 may be mounted on the PCB 250. The battery 240 and/or the PCB 250 may be fixedly mounted in the internal space of the first housing 210. For example, the PCB 250 may be fixedly connected to the front cover 211.

In one embodiment, the first fastening structure 260 and the second fastening structure 270 may be fastened to each other. As the first fastening structure 260 is fastened to the second fastening structure 270, popping out of the rear cover 212 may be alleviated. For example, the first fastening structure 260 may be fixedly connected to the PCB 250. For example, the second fastening structure 270 may be fixedly connected to the inner surface (e.g., the +z direction surface) of the rear cover 212. The first fastening structure 260 and the second fastening structure 270 may be arranged at positions corresponding to each other. For example, the first fastening structure 260 and the second fastening structure 270 may be arranged near the central portion of the rear cover 212. For example, the first fastening structure 260 may be substantially arranged near the periphery of the PCB 250. Through fastening between the first fastening structure 260 and the second fastening structure 270, a phenomenon that the central portion of the rear cover 212 pops out or is pressed relative to the front cover 211 may be alleviated. However, this is merely an example, and the location of the first fastening structure 260 and/or the second fastening structure 270 is not limited thereto.

Figure 2C:
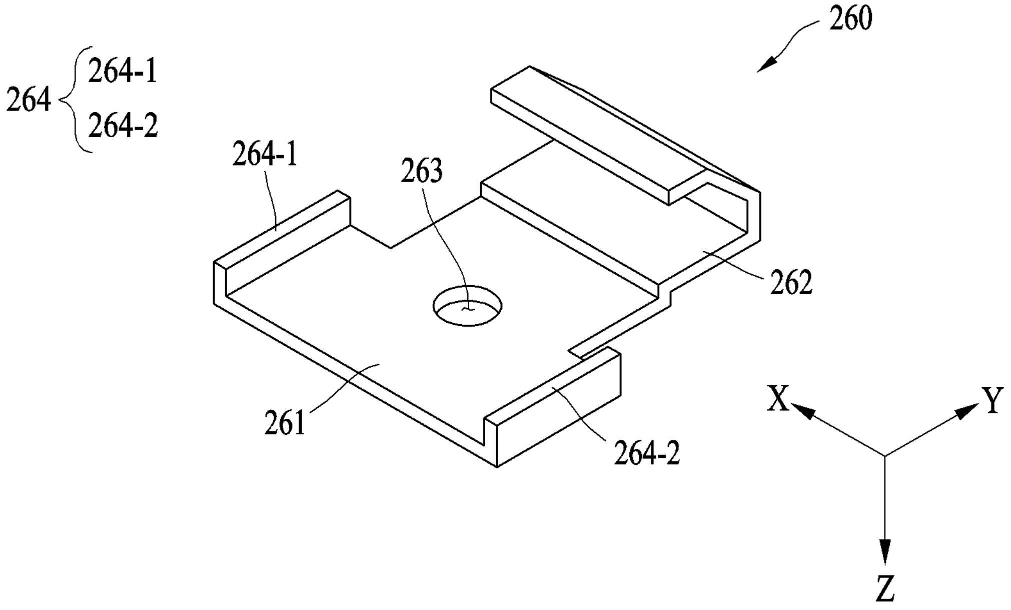
FIG. 2C is a perspective view of a first fastening structure according to an embodiment of the disclosure.

FIG. 2C is a perspective view of a first fastening structure according to an embodiment of the disclosure.

Figure 2D:
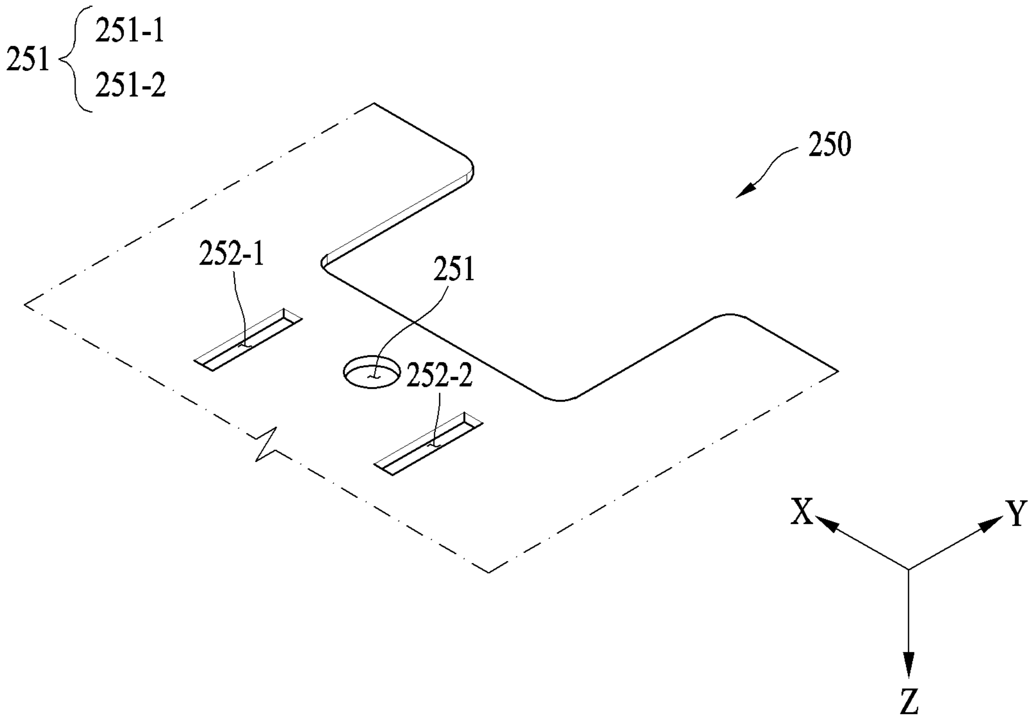
FIG. 2D is a partial perspective view of a printed circuit board (PCB) according to an embodiment of the disclosure.

FIG. 2D is a partial perspective view of a PCB according to an embodiment of the disclosure.

Figure 2E:
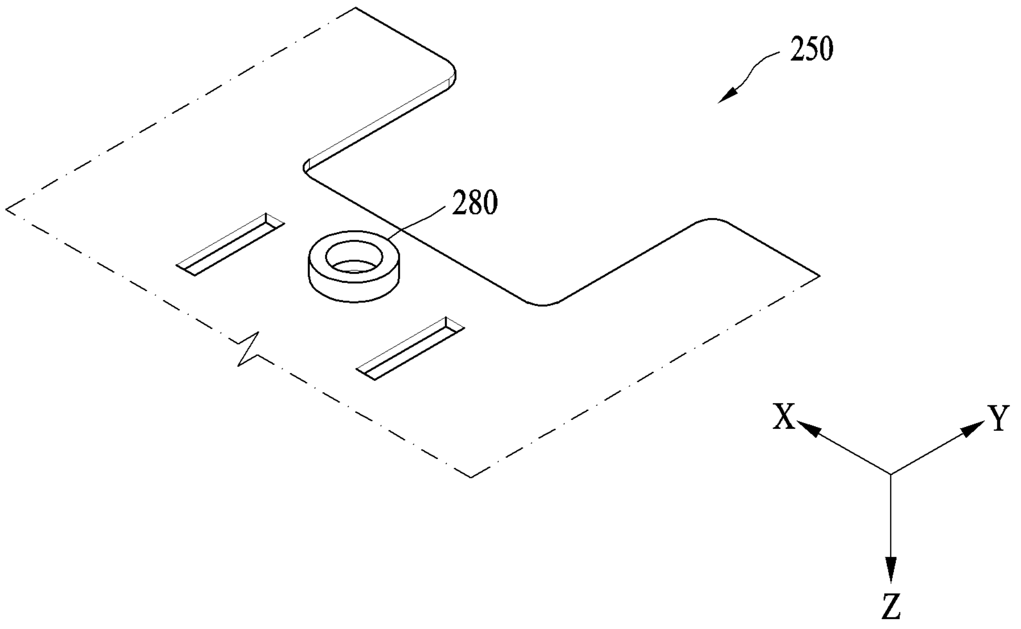
FIG. 2E is a perspective view illustrating a state in which a fastening auxiliary member is coupled to the PCB according to an embodiment of the disclosure.

FIG. 2E is a perspective view illustrating a state in which a fastening auxiliary member is coupled to the PCB according to an embodiment of the disclosure.

Figure 2F:
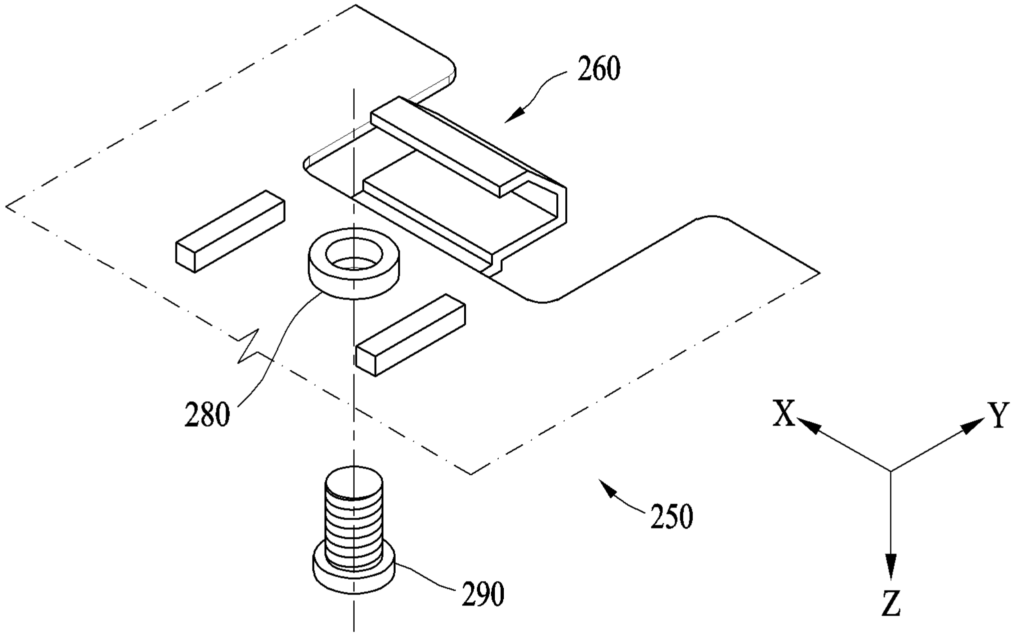
FIG. 2F is a perspective view illustrating an example of coupling the first fastening structure to the PCB according to an embodiment of the disclosure.

FIG. 2F is a perspective view illustrating an example of coupling the first fastening structure to the PCB according to an embodiment of the disclosure.

Figure 2G:
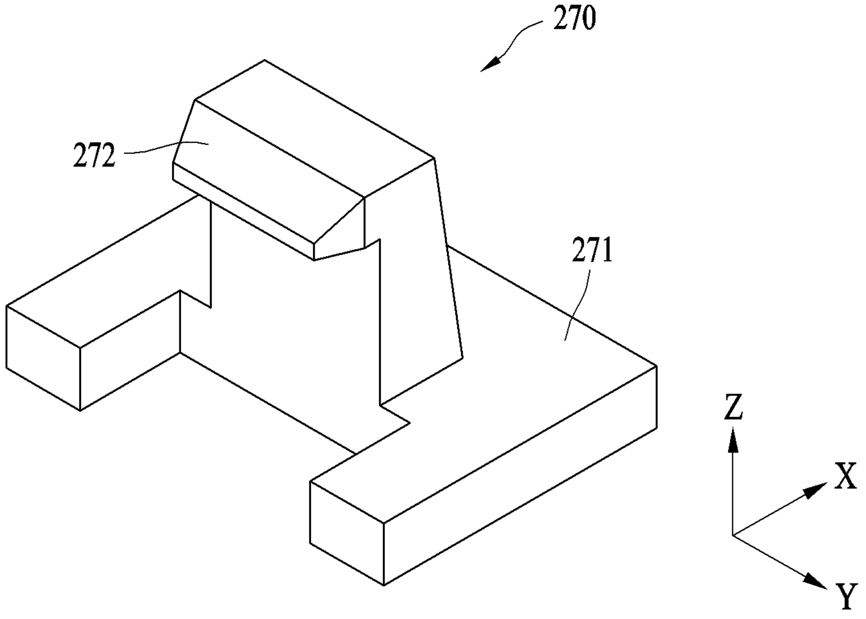
FIG. 2G is a perspective view of a second fastening structure according to an embodiment of the disclosure.

FIG. 2G is a perspective view of a second fastening structure according to an embodiment of the disclosure.

Figure 2H:
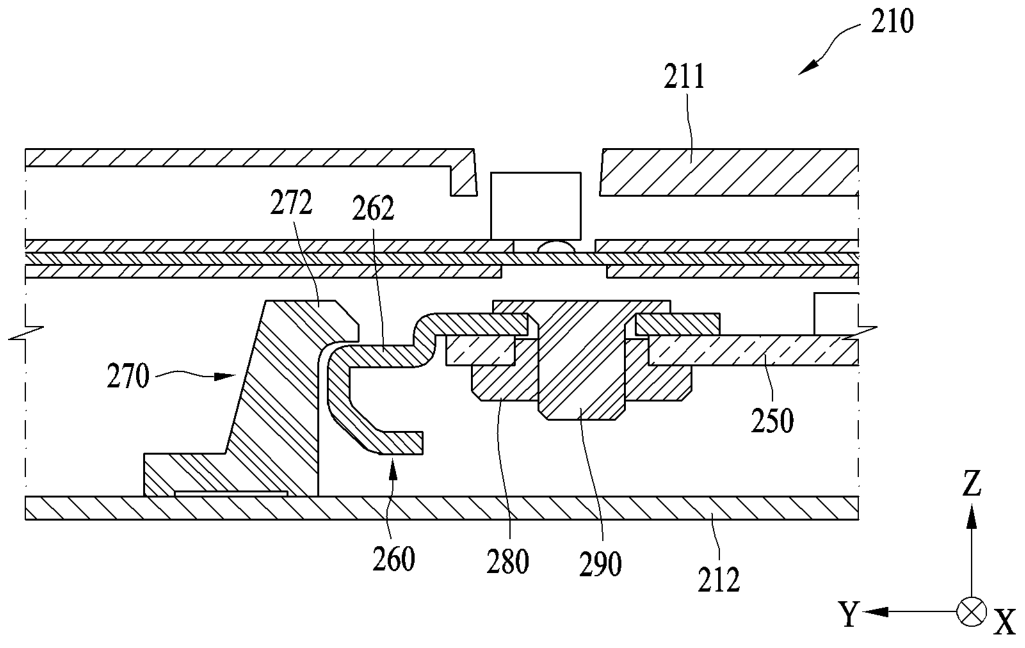
FIG. 2H is a cross-sectional view of the first housing in a state in which the first fastening structure and the second fastening structure are fastened to each other, according to an embodiment of the disclosure.

FIG. 2H is a cross-sectional view of the first housing in a state in which the first fastening structure and the second fastening structure are fastened to each other, based on a plane A of FIG. 2B according to an embodiment of the disclosure.

Hereinafter, a description of the first fastening structure 260 and the second fastening structure 270 is provided with reference to FIGS. 2C to 2H.

In an embodiment, the first fastening structure 260 may include a first main body 261, a first hook 262, a first fastening hole 263, and a guide protrusion 264.

In an embodiment, the first main body 261 may form at least a portion of the external figure of the first fastening structure 260. For example, the first main body 261 may be substantially formed in a plate shape. The first hook 262 may be formed on one side (e.g., +y direction side) of the first main body 261. The first hook 262 may include a shape that substantially functions as a hook. The first fastening hole 263 may be formed near the central portion of the first main body 261. For example, the first fastening hole 263 may penetrate the first main body 261. At least one first fastening hole 263 may be formed.

In an embodiment, the guide protrusion 264 may be formed on the first main body 261. For example, a pair of guide protrusions 264-1 and 264-2 may be formed on both sides (e.g., +x and −x directions) of the first main body 261, respectively. For example, the pair of guide protrusions 264-1 and 264-2 may protrude in the −z direction from the both sides (e.g., +x and −x directions), respectively.

In an embodiment, the first main body 261, the first hook 262, and the guide protrusion 264 may be substantially formed as one. However, this is merely an example, and the location, number, and/or shape of the first main body 261, the first hook 262, the first fastening hole 263, and/or the guide protrusion 264 are not limited thereto.

In an embodiment, a second fastening hole 251 and a guide hole 252 may be formed in a portion of the PCB 250. The second fastening hole 251 may penetrate the PCB 250. The number of second fastening holes 251 may correspond to the number of first fastening holes 263. The guide hole 252 may penetrate the PCB 250 at a location adjacent to the second fastening hole 251. The guide hole 252 may be formed in the number and/or shape corresponding to the guide protrusion 264. For example, a pair of guide holes 252-1 and 252-2 may be formed. The guide protrusions 264-1 and 264-2 of the first fastening structure 260 may be inserted into the guide holes 252-1 and 252-2, respectively.

In an embodiment, the first fastening structure 260 may be fixedly arranged inside the first housing 210. For example, the first fastening structure 260 may be fixedly connected to the PCB 250. As a fastening member 290 is inserted into the first fastening hole 263 and the second fastening hole 251 while the first fastening hole 263 and the second fastening hole 251 are arranged to communicate with each other, the first fastening structure 260 may be fixedly connected to the PCB 250. In addition, as the guide protrusions 264-1 and 264-2 are inserted into the guide holes 252-1 and 252-2, respectively, the first fastening structure 260 may not rotate relative to the PCB 250 while the first fastening structure 260 is fastened to the PCB 250. In addition, as illustrated in FIGS. 2E and 2F, a fastening auxiliary member 280 may be fixedly inserted into the first fastening hole 263 and/or the second fastening hole 251. For example, the fastening auxiliary member 280 may be a member including a screw crest therein and the fastening member 290 may be a screw and/or a bolt. For example, the fastening auxiliary member 280 may be arranged on the PCB 250 by self-clinching, broaching, flaring, and/or surface mounting. For example, the fastening auxiliary member 280 may include a nut (e.g., a PEM nut). However, this is merely an example and a method of fixedly connecting the first fastening structure 260 to the PCB 250 is not limited thereto.

In an embodiment, the second fastening structure 270 may include a second main body 271 and a second hook 272.

In an embodiment, the second main body 271 may form at least a portion of the external figure of the second fastening structure 270. For example, the second main body 271 may be substantially formed in a plate shape. The second main body 271 may be a portion that is attached to the inner surface (e.g., the +z direction surface) of the rear cover 212.

In an embodiment, the second hook 272 may protrude from the second main body 271. The second hook 272 may include a shape that substantially functions as a hook. The second main body 271 and the second hook 272 may be substantially formed as one. However, this is merely an example, and the location, number, and/or shape of the second main body 271 and/or the second hook 272 are not limited thereto.

In an embodiment, the second fastening structure 270 may be fixedly connected to the rear cover 212. For example, the second fastening structure 270 may be fixed to the inner surface (e.g., the +z direction surface) of the rear cover 212 through an adhesive member. For example, the adhesive member may fixedly attach the second main body 271 to the inner surface (e.g., the +z direction surface) of the rear cover 212. For example, the adhesive member may include adhesive glue or adhesive tape. According to the structure described above, by fixedly connecting the second fastening structure 270 to the rear cover 212, a separate member may not be exposed to the outer surface (e.g., the −z direction surface) of the rear cover 212, and thus, the aesthetics of an electronic device (e.g., the electronic device 200 of FIG. 2A) may not deteriorate. In addition, without being limited to a material of the rear cover 212, the second fastening structure 270 may be fixedly connected to the rear cover 212 formed of various materials. However, this is merely an example, and the method of fixedly connecting the second fastening structure 270 to the rear cover 212 is not limited thereto. For example, the second fastening structure 270 may be integrally formed with the rear cover 212. For example, the second fastening structure 270 may be integrally formed with the rear cover 212 through two-shot injection molding or insert injection molding.

In an embodiment, as illustrated in FIG. 2H, in the first housing 210, the first fastening structure 260 may be fastened to the second fastening structure 270. When the rear cover 212 is fastened to the front cover 211, the first hook 262 of the first fastening structure 260 may be fastened to the second hook 272 of the second fastening structure 270. For example, the first fastening structure 260 and the second fastening structure 270 may be substantially arranged near the central portion of the rear cover 212. For example, the first fastening structure 260 may be substantially arranged near the periphery of the PCB 250. According to the structure described above, since the first fastening structure 260 is fastened to the second fastening structure 270, at least a portion (e.g., the central portion) of the rear cover 212 may be less pressed or less pop out in the thickness direction (e.g., the z direction) of the rear cover 212.

Figure 3A:
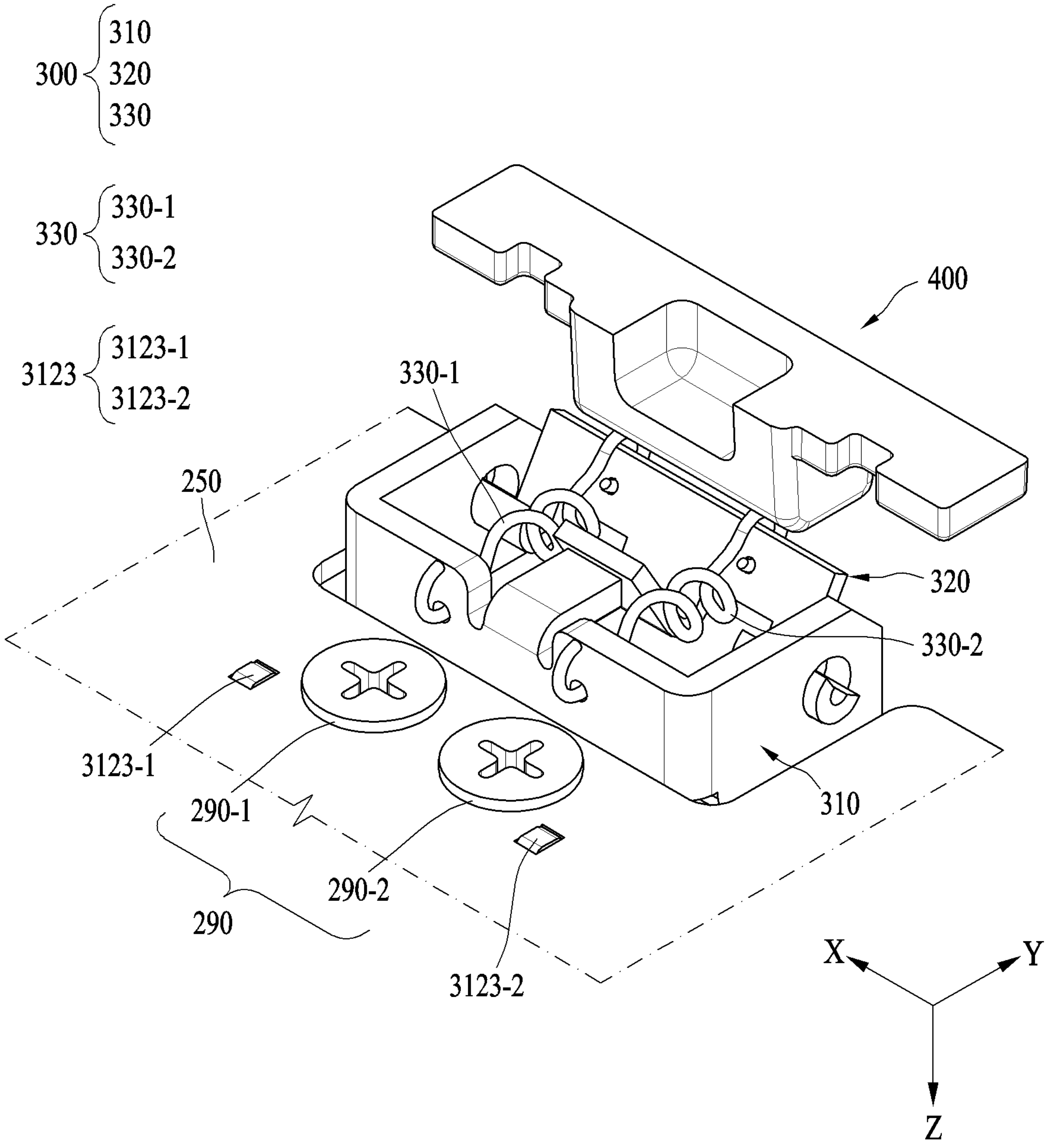
FIG. 3A is a perspective view illustrating a state before a first fastening structure is fastened to a second fastening structure according to an embodiment of the disclosure.

FIG. 3A is a perspective view illustrating a state before a first fastening structure is fastened to a second fastening structure according to an embodiment of the disclosure.

Figure 3B:
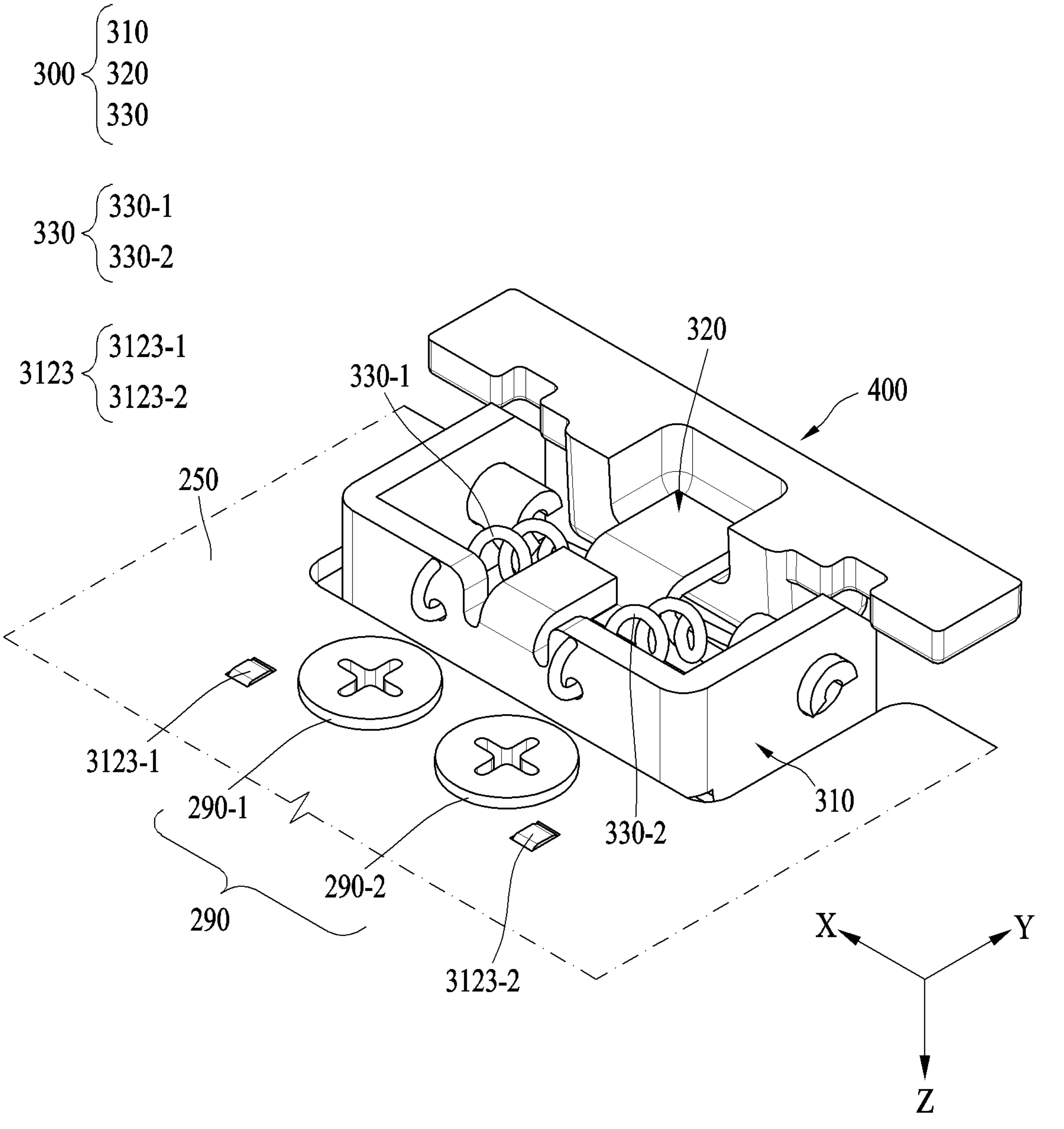
FIG. 3B is a perspective view illustrating a state after the first fastening structure is fastened to the second structure according to an embodiment of the disclosure.

FIG. 3B is a perspective view illustrating a state after the first fastening structure is fastened to the second structure according to an embodiment of the disclosure.

Figure 3C:
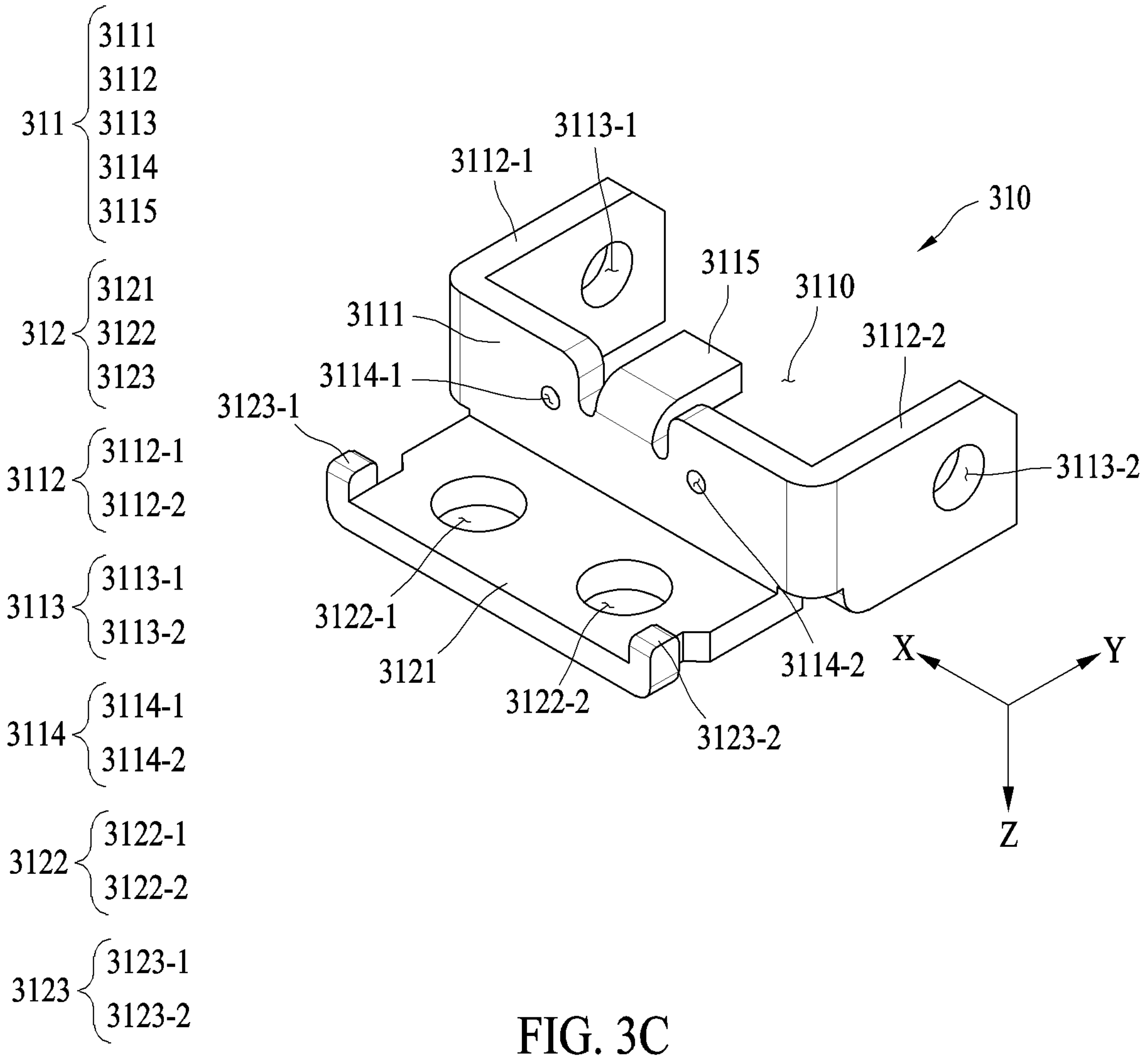
FIG. 3C is a perspective view of a fixing member according to an embodiment of the disclosure.

FIG. 3C is a perspective view of a fixing member according to an embodiment of the disclosure.

Figure 3D:
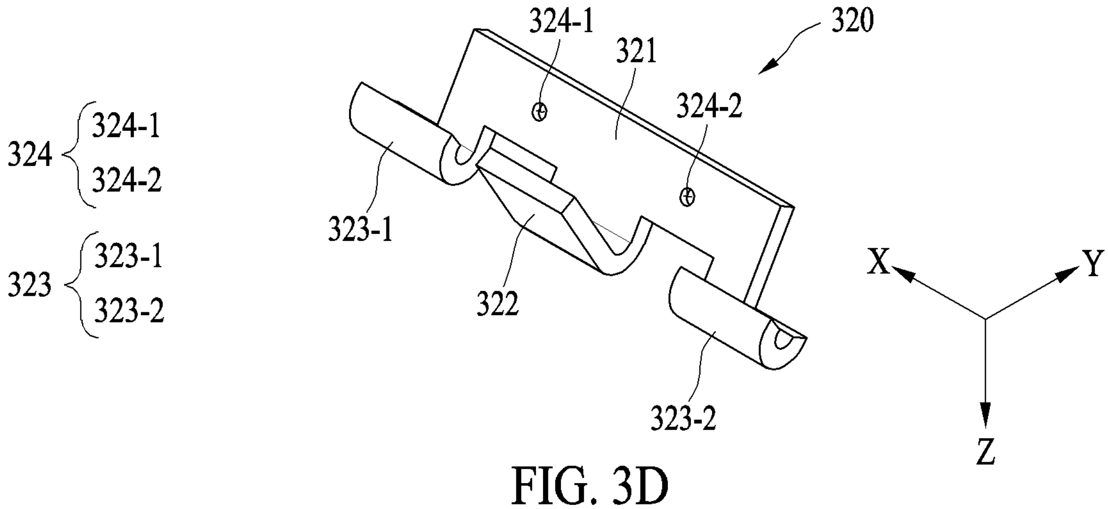
FIG. 3D is a perspective view of a rotation hook according to an embodiment of the disclosure.

FIG. 3D is a perspective view of a rotation hook according to an embodiment of the disclosure.

Figure 3E:
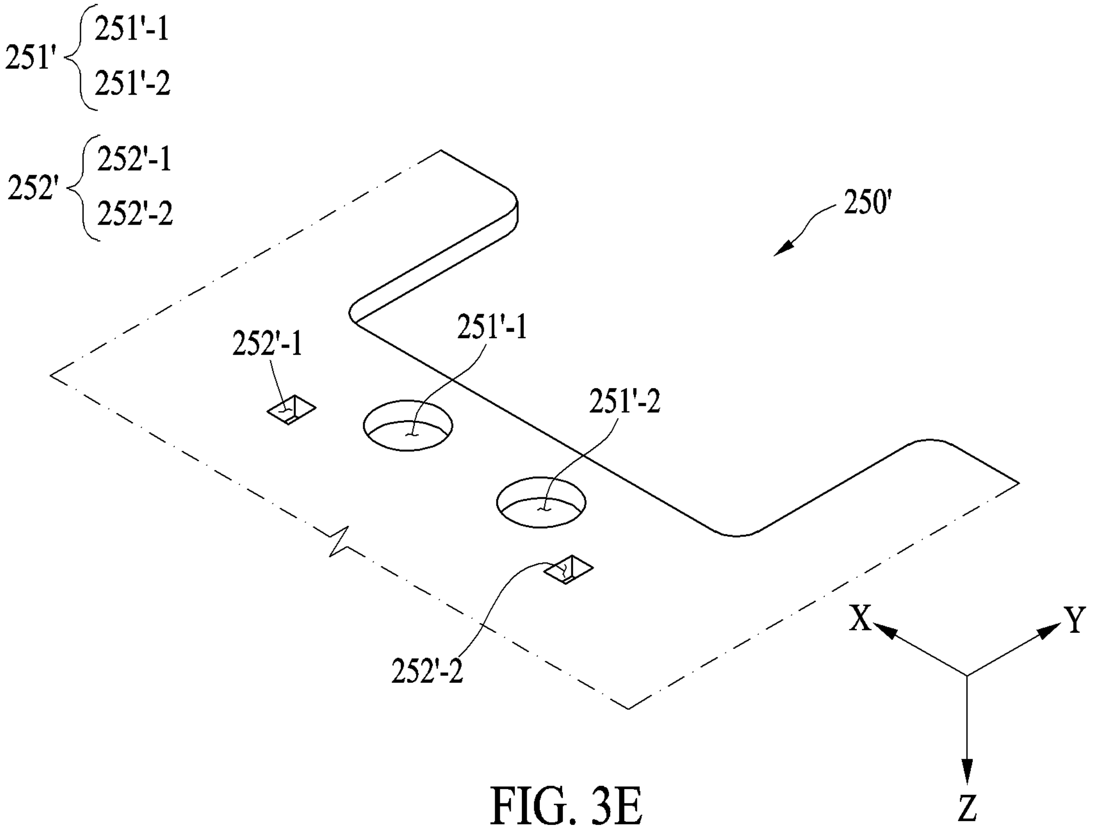
FIG. 3E is a partial perspective view of a PCB according to an embodiment of the disclosure.

FIG. 3E is a partial perspective view of a PCB according to an embodiment of the disclosure.

Figure 3F:
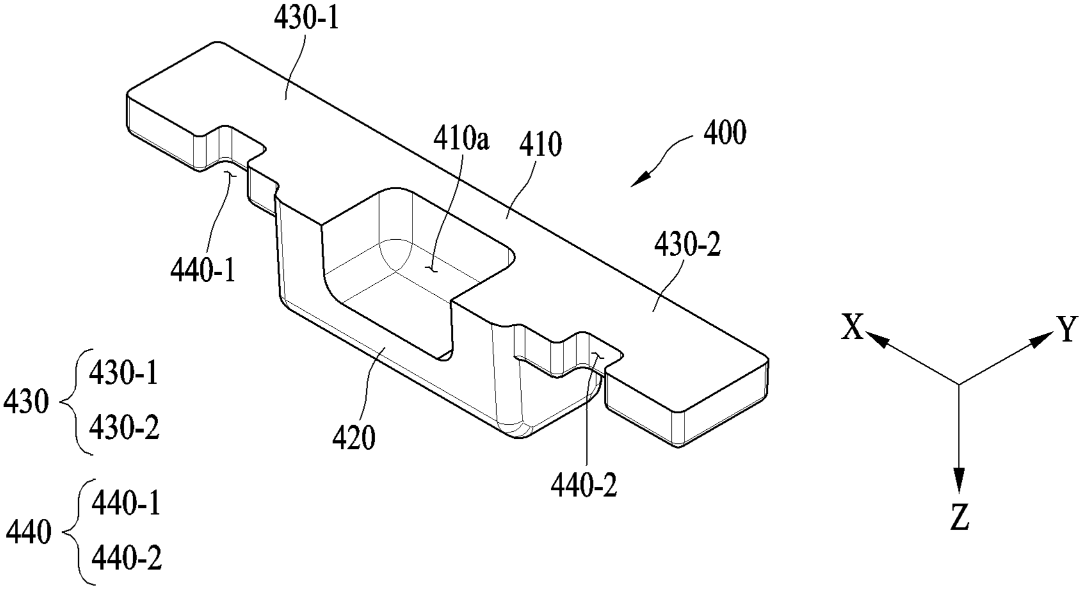
FIG. 3F is a perspective view of a second fastening structure according to an embodiment of the disclosure.

FIG. 3F is a perspective view of a second fastening structure according to an embodiment of the disclosure.

Hereinafter, a description of a first fastening structure 300 and a second fastening structure 400 is provided with reference to FIGS. 3A to 3F.

In an embodiment, the first fastening structure 300 and the second fastening structure 400 may be fastened to each other. The first fastening structure 300 may be fixedly connected to a PCB 250'.

In an embodiment, the first fastening structure 300 may include a fixing member 310, a rotation hook 320, and an elastic member 330.

In one embodiment, the fixing member 310 may be fixedly connected to the PCB 250'. The fixing member 310 may include a bracket part 311 and a fixing part 312.

In an embodiment, the bracket part 311 may provide a rotation space 3110 in which the rotation hook 320 rotates. The bracket part 311 may include a first bracket body 3111, a second bracket body 3112, a rotation hook insertion hole 3113, a first elastic member connection hole 3114, and a stopper 3115.

In an embodiment, the first bracket body 3111 may be a portion that is connected to the fixing part 312. The second bracket body 3112 may be bent and extend from the first bracket body 3111. For example, a pair of second bracket bodies 3112-1 and 3112-2 may be bent and extend from both sides (e.g., the +x and −x direction sides) of the first bracket body 3111, respectively. The first bracket body 3111 and the pair of second bracket bodies 3112-1 and 3112-2 may form the rotation space 3110 in which the rotation hook 320 rotates.

In an embodiment, the rotation hook insertion holes 3113-1 and 3113-2 may penetrate the second bracket bodies 3112-1 and 3112-2, respectively. The rotation hook 320 may be rotatably inserted into the rotation hook insertion holes 3113-1 and 3113-2.

In an embodiment, the first elastic member connection hole 3114 may penetrate the first bracket body 3111. A pair of first elastic member connection holes 3114-1 and 3114-2 may be formed. The first elastic member connection hole 3114 may be connected to one side (e.g., the −y direction side) of the elastic member 330.

In an embodiment, the stopper 3115 may be formed on the central portion of the first bracket body 3111. For example, the stopper 3115 may protrude from the central portion of the first bracket body 3111 toward the rotation space 3110. The stopper 3115 may prevent the rotation hook 320 from over-rotating in one direction (e.g., a counterclockwise direction based on FIG. 3G) (e.g., a first direction) in the rotation space 3110.

In an embodiment, the first bracket body 3111, the second bracket body 3112, and the stopper 3115 may be substantially formed as one. However, this is merely an example, and the location, number, and/or shape of the first bracket body 3111, the second bracket body 3112, the rotation hook insertion hole 3113, the first elastic member connection hole 3114, and the stopper 3115 are not limited thereto.

In an embodiment, the fixing part 312 may fix the bracket part 311 to the PCB 250'. The fixing part 312 may include a fixing body 3121, a first fastening hole 3122, and a guide protrusion 3123.

In an embodiment, the fixing body 3121 may be substantially formed in a plate shape. The first fastening hole 3122 may penetrate the fixing body 3121. At least one first fastening hole 3122 may be formed. For example, a pair of first fastening holes 3122-1 and 3122-2 may be formed. The guide protrusion 3123 may protrude from the fixing body 3121. For example, a pair of guide protrusions 3123-1 and 3123-2 may protrude in the −z direction from both sides (e.g., the +x and −x direction sides) of the fixing body 3121. The fixing body 3121 and the guide protrusion 3123 may be substantially formed as one. However, this is merely an example, and the location, number, and/or shape of the fixing body 3121, the first fastening hole 3122, and/or the guide protrusion 3123 are not limited thereto.

In an embodiment, a second fastening hole 251' and a guide hole 252' may be formed in a portion of the PCB 250'.

In an embodiment, the second fastening hole 251' may penetrate the PCB 250'. The number of second fastening holes 251' may correspond to the number of first fastening holes 3122. For example, a pair of second fastening holes 251'-1 and 251'-2 may be formed.

In an embodiment, the guide hole 252' may penetrate the PCB 250' at a location adjacent to the second fastening hole 251'. The guide hole 252' may be formed in the number and/or shape corresponding to the guide protrusion 3123. For example, a pair of guide holes 252'-1 and 252'-2 may be formed. The guide protrusions 3123-1 and 3123-2 of the fixing member 310 may be inserted into the guide holes 252'-1 and 252'-1, respectively.

In an embodiment, the fixing member 310 may be fixedly arranged inside a first housing (e.g., the first housing 210 of FIG. 2A). For example, the fixing member 310 may be fixedly connected to the PCB 250'. When the first fastening holes 3122-1 and 3122-2 are arranged to communicate with the second fastening holes 251'-1 and 251'-2, respectively, the fixing member 310 may be fixedly connected to the PCB 250' by inserting a fastening member (e.g., the fastening members 290-1 and 290-2 of FIG. 3A) into each of the first fastening holes 3122-1 and 3122-2 and the second fastening holes 251'-1 and 251'-2. In addition, by inserting the guide protrusions 3123-1 and 3123-2 into the guide holes 252'-1 and 252'-2, respectively, the fixing member 310 may be prevented from rotating on the PCB 250' while the fixing member 310 is fastened to the PCB 250'. In addition, a fastening auxiliary member (e.g., the fastening auxiliary member 280 of FIG. 3G) may be fixedly inserted into the first fastening hole 3122 and/or the second fastening hole 251'. For example, the fastening auxiliary member 280 may be a member including a screw crest therein and the fastening member 290 may be a screw and/or a bolt. For example, the fastening auxiliary member 280 may be arranged on the PCB 250 by self-clinching, broaching, flaring, and/or surface mounting. For example, the fastening auxiliary member 280 may include a nut (e.g., a PEM nut). However, this is merely an example, the method of fixedly connecting the fixing member 310 to the PCB 250' is not limited thereto.

In an embodiment, the rotation hook 320 may be rotatably connected to the fixing member 310. The rotation hook 320 may be fastened to the second fastening structure 400. The rotation hook 320 may include a first main body 321, a first hook 322, a rotating part 323, and a second elastic member connection hole 324.

In an embodiment, the first main body 321 may form at least a portion of the rotation hook 320. The first main body 321 may be substantially formed in a plate shape. The first hook 322 may be formed on one side (e.g., the −y direction side) of the first main body 321. The first hook 322 may include a shape that substantially functions as a hook. For example, the first hook 322 may be bent and extend from the central portion of the first main body 321.

In an embodiment, the rotating part 323 may protrude from the first main body 321. For example, a pair of rotating parts 323-1 and 323-2 may respectively protrude from both sides (e.g., the +x and −x direction sides) of the first main body 321. The rotating part 323 may substantially include a shaft shape. The rotating parts 323-1 and 323-2 may be rotatably inserted into the rotation hook insertion holes 3113-1 and 3113-2 formed in the fixing member 310. The pair of rotating parts 323-1 and 323-2 may substantially function as a rotation axis for the rotation hook 320 to rotate relative to the fixing member 310.

In an embodiment, the second elastic member connection hole 324 may penetrate the first main body 321. A pair of second elastic member connection holes 324-1 and 324-2 may be formed. The second elastic member connection hole 324 may be connected to the other side (e.g., the +y direction side) of the elastic member 330.

In an embodiment, one end (e.g., the −y direction end) (e.g., a first end) of the elastic member 330 may be connected to the fixing member 310 and the other end (e.g., the +y direction end) (e.g., a second end) of the elastic member 330 may be connected to the rotation hook 320. For example, one end (e.g., the −y direction end) (e.g., a first end) of the elastic member 330 may be inserted into the first elastic member connection hole 3114 formed in the fixing member 310 and the other end (e.g., the +y direction end) (e.g., a second end) of the elastic member 330 may be inserted into the second elastic member connection hole 324 formed in the rotation hook 320. At least one elastic member 330 may be provided. For example, a pair of elastic members 330-1 and 330-2 may be provided. For example, the elastic member 330 may include a tension spring. A detailed description of the elastic member 330 is provided below.

In an embodiment, the second fastening structure 400 may be fixedly arranged on the inner surface (e.g., the +z direction surface of FIG. 2B) of a rear cover (e.g., the rear cover 212 of FIG. 2B). For example, the second fastening structure 400 may be fixed to the inner surface (e.g., the +z direction surface of FIG. 2B) of the rear cover 212 through an adhesive member. However, this is merely an example, and the method of fixedly connecting the second fastening structure 400 to the rear cover 212 is not limited thereto.

In an embodiment, the second fastening structure 400 may include a second main body 410, a second hook 420, a flange 430, and a cutting groove 440.

In an embodiment, the second main body 410 may form at least a portion of the external figure of the second fastening structure 400. The second main body 410 may be a portion that is attached to the inner surface (e.g., the +z direction surface) of a rear cover (e.g., the rear cover 212 of FIG. 2B).

In an embodiment, the second hook 420 may be formed on the second main body 410. The second hook 420 may include a shape that substantially functions as a hook. For example, the second hook 420 may be formed by forming a recessed space 410*a* in the second main body 410. However, this is merely an example, and the shape of the second hook 420 is not limited thereto.

In an embodiment, the flange 430 may protrude and extend from the second main body 410. For example, a pair of flanges 430-1 and 430-2 may protrude and extend from both sides (e.g., the +x and −x direction sides) of the second main body 410, respectively. With the second main body 410, the pair of flanges 430-1 and 430-2 may be a portion that is attached to the inner surface (e.g., the +z direction surface) of a rear cover (e.g., the rear cover 212 of FIG. 2B). According to the structure described above, the second fastening structure 400 may increase an area attached to the inner surface (e.g., the +z direction surface) of the rear cover 212, and thus, an adhesive force may increase.

In an embodiment, cutting grooves 440-1 and 440-2 may be formed on one of the sides (e.g., the −y direction side) of the flanges 430-1 and 430-2, respectively. As the cutting groove 440 is formed in the flange 430, the flange 430 may not interfere with the second bracket body 3112 during a process of fastening the second fastening structure 400 to the first fastening structure 300.

In an embodiment, the second main body 410, the second hook 420, and the flange 430 may be substantially formed as one. However, this is merely an example, and the location, number, and/or shape of the second main body 410, the second hook 420, the flange 430, and/or the cutting groove 440 are not limited thereto.

Figure 3G:
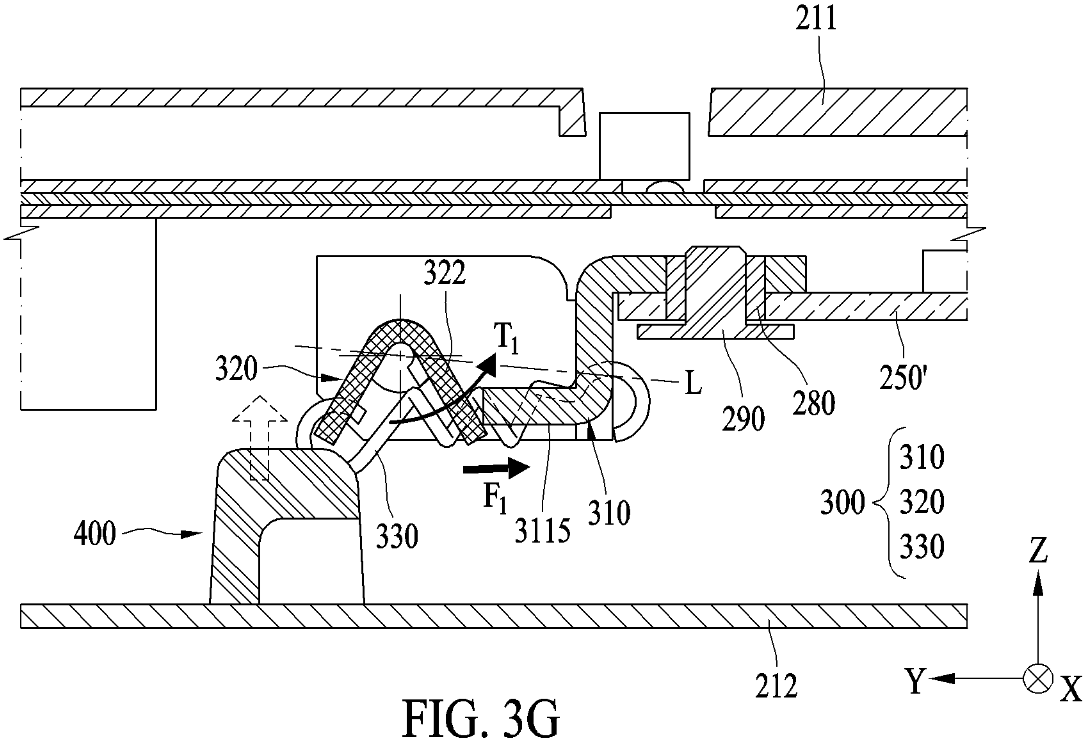
FIG. 3G is a cross-sectional view of a first housing in a state before the first fastening structure is fastened to the second fastening structure according to an embodiment of the disclosure.

FIG. 3G is a cross-sectional view of a first housing in a state before the first fastening structure is fastened to the second fastening structure according to an embodiment of the disclosure.

Figure 3H:
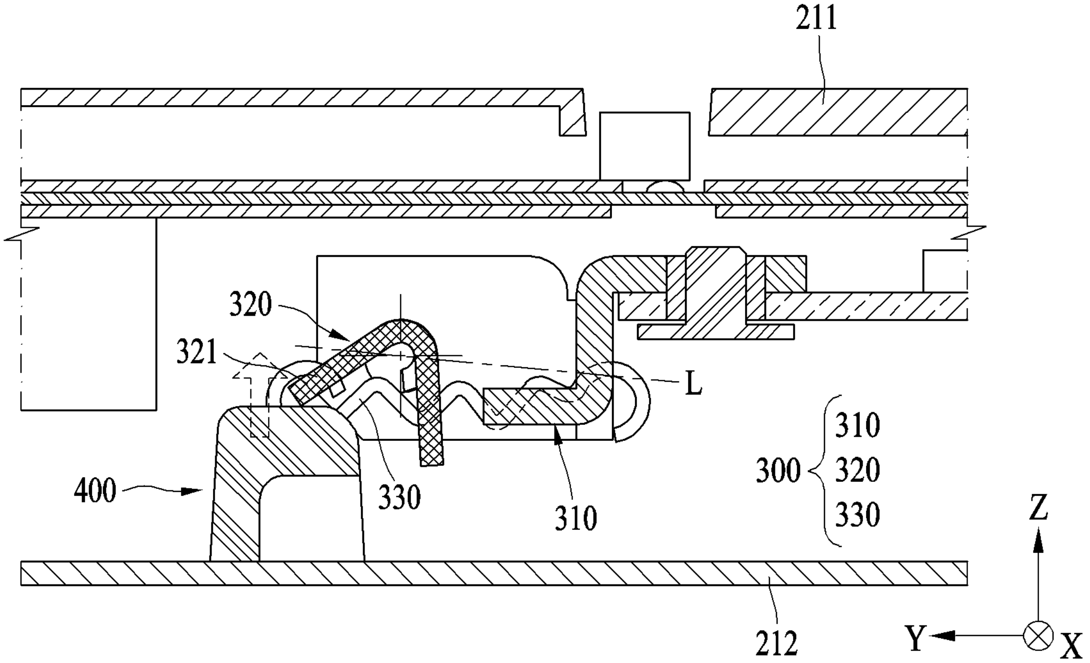
FIG. 3H is a cross-sectional view of the first housing in an intermediate state in which the first fastening structure is partially fastened to the second fastening structure according to an embodiment of the disclosure.

FIG. 3H is a cross-sectional view of the first housing in an intermediate state in which the first fastening structure is partially fastened to the second fastening structure according to an embodiment of the disclosure.

Figure 3I:
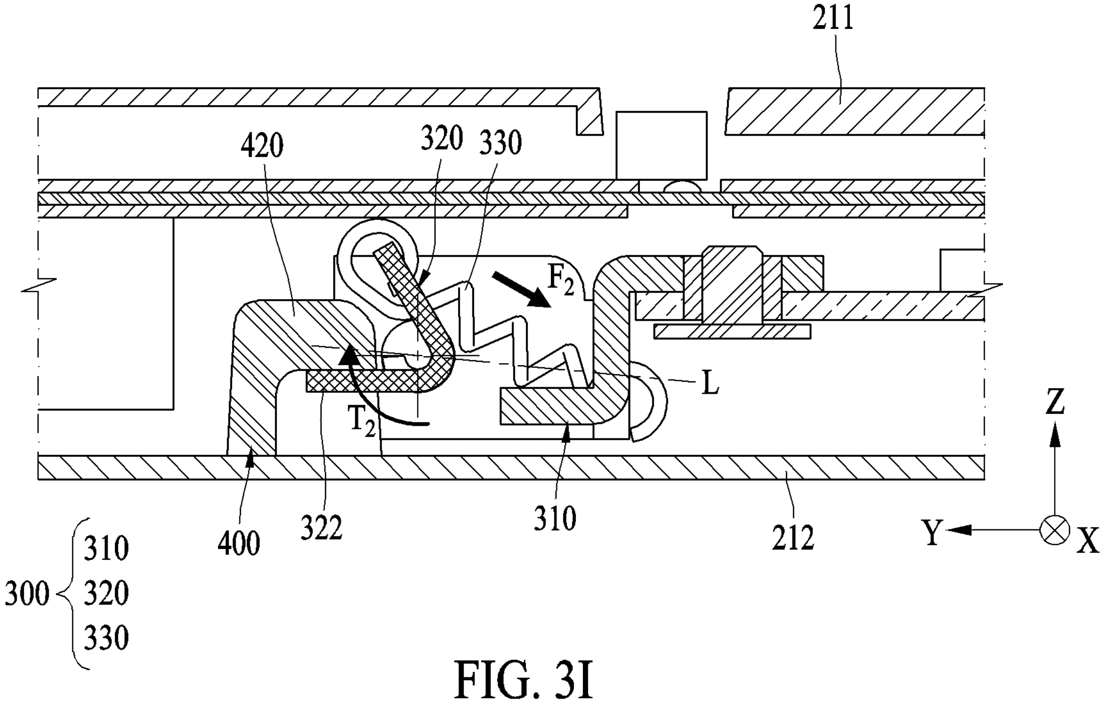
FIG. 3I is a cross-sectional view of the first housing in a state in which the first fastening structure is fastened to the second fastening structure according to an embodiment of the disclosure.

FIG. 3I is a cross-sectional view of the first housing in a state in which the first fastening structure is fastened to the second fastening structure according to an embodiment of the disclosure.

Hereinafter, a description of a process of fastening the first fastening structure 300 is fastened to the second fastening structure 400 according to an embodiment is provided with reference to FIGS. 3G to 3I.

In an embodiment, the elastic member 330 may generate a torque that rotates the rotation hook 320 relative to the fixing member 310 in one direction (e.g., a counterclockwise direction based on FIG. 3G) (e.g., a first direction) or the other direction (e.g., a clockwise direction based on FIG. 3G) (e.g., a second direction) based on a fastening state of the rotation hook 320 to the second fastening structure 400.

In an embodiment, referring to FIG. 3G, in a state before the second fastening structure 400 is fastened to the rotation hook 320, the rotation hook 320 may be arranged such that the first hook 322 contacts the stopper 3115. In the state described above, the elastic member 330 may generate an elastic force $F_1$ in a contracting direction. The elastic force $F_1$ of the elastic member 330 may generate a torque $T_1$ that rotates the rotation hook 320 in one direction (e.g., the counterclockwise direction based on FIG. 3G) (e.g., a first direction). In this example, the one direction (e.g., the counterclockwise direction based on FIG. 3G) (e.g., a first direction) may be a direction in which the first hook 322 presses the stopper 3115. According to the structure described above, in a state before the second fastening structure 400 is fastened to the rotation hook 320, the first hook 322 may be maintained to be in contact with the stopper 3115 by the elastic force $F_1$ of the elastic member 330.

In an embodiment, referring to FIG. 3H, as the rear cover 212 moves in a direction (e.g., +z direction) approaching the front cover 211, the second fastening structure 400 may begin to fasten to the rotation hook 320. While the second fastening structure 400 is fastened to the rotation hook 320, the second fastening structure 400 may press the first main body 321 in the +z direction. Accordingly, the rotation hook 320 may rotate in the other direction (e.g., the clockwise direction based on FIG. 3H) (e.g., a second direction) by a corresponding angle to the fixing member 310 and during this process, the elastic member 330 may be tensioned or contracted. Before the elastic member 330 crosses a reference line L (e.g., a state in which the elastic member 330 is below the reference line L based on FIG. 3H), a torque that the elastic member 330 rotates the rotation hook 320 in a direction (e.g., the counterclockwise direction based on FIG. 3H) (e.g., a first direction) may be generated. After the elastic member 330 crosses the reference line L (e.g., a state in which the elastic member 330 is above the reference line L based on FIG. 3H), a torque that the elastic member 330 rotates the rotation hook 320 in the other direction (e.g., the clockwise direction based on FIG. 3H) (e.g., a second direction) may be generated. In this example, the reference line L may be a virtual line that connects a rotation axis (e.g., the rotation hook insertion hole 3113 of FIG. 3C) of the rotation hook 320 to a location (e.g., the first elastic member connection hole 3114 of FIG. 3C) in which the elastic member 330 is connected to the fixing member 310.

In an embodiment, referring to FIG. 3I, when the rear cover 212 is fastened to the front cover 211, the second fastening structure 400 may also be fastened to the rotation hook 320. When the second fastening structure 400 is fastened to the rotation hook 320, the elastic member 330 may generate an elastic force $F_2$ in a contracting direction. The elastic force $F_2$ of the elastic member 330 may generate a torque $T_2$ that rotates the rotation hook 320 relative to the fixing member 310 in the other direction (e.g., the clockwise direction based on FIG. 3I) (e.g., a second direction). In an example, the other direction (e.g., the clockwise direction based on FIG. 3I) (e.g., a second direction) may be a direction in which a fastening force between the second fastening structure 400 and the rotation hook 320 increases. For example, as the first hook 322 presses the second hook 420 by the torque $T_2$ generated by the elastic member 330, a fastening force between the first hook 322 and the second hook 420 may increase. According to the structure described above, to release fastening between the second fastening structure 400 and the rotation hook 320, a torque and/or a force greater than the torque $T_2$ in the other direction (e.g., the clockwise direction based on FIG. 3I) (e.g., a second direction) generated by the elastic member 330 may need to be applied to the second fastening structure 400, and thus, release of fastening between the second fastening structure 400 and the rotation hook 320 by an external impact may decrease.

In an embodiment, referring to FIG. 3I, when the rear cover 212 is fastened to the front cover 211, the first hook 322 of the first fastening structure 300 may be fastened to the second hook 420 of the second fastening structure 400. For example, the first fastening structure 300 and the second fastening structure 400 may be substantially arranged near the central portion of the rear cover 212. For example, the first fastening structure 300 may be substantially arranged near the periphery of the PCB 250. According to the structure described above, since the first fastening structure 300 is fastened to the second fastening structure 400, at least a portion (e.g., the central portion) of the rear cover 212 may be less pressed or pop out in the thickness direction (e.g., the z direction) of the rear cover 212. In addition, since release of fastening between the first fastening structure 300 and the second fastening structure 400 due to an external impact may decrease, stability may improve.

Figure 4:
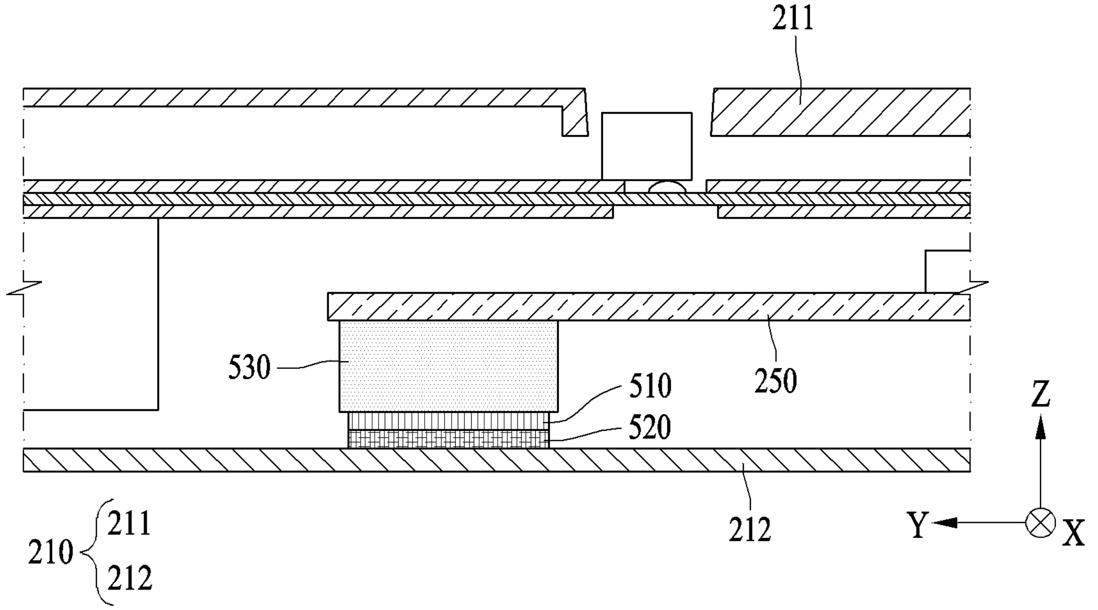
FIG. 4 is a cross-sectional view of a first housing according to an embodiment of the disclosure.

FIG. 4 is a cross-sectional view of a first housing according to an embodiment of the disclosure.

Referring to FIG. 4, in one embodiment, a first Velcro® member 510, a second Velcro® member 520, and a height compensation member 530 may be arranged inside the first housing 210.

In an embodiment, the first Velcro® member 510 may be fixedly arranged inside the first housing 210. For example, the first Velcro® member 510 may be fixedly arranged on the PCB 250. However, this is merely an example, and the location where the first Velcro® member 510 is fixed is not limited thereto. For example, the first Velcro® member 510 may be fixedly arranged on a battery (e.g., the battery 240 of FIG. 2B) or a battery controller (not shown).

In an embodiment, the second Velcro® member 520 may be fastened to the first Velcro® member 510. The second Velcro® member 520 may be fixedly arranged on the inner surface (e.g., the +z direction surface) of the rear cover 212. The second Velcro® member 520 may be arranged at a location corresponding to the location of the first Velcro® member 510.

In an embodiment, the height compensation member 530 may compensate for the height in the thickness direction (e.g., the z direction) of the first Velcro® member 510 and/or the second Velcro® member 520. For example, the height compensation member 530 may be arranged between the PCB 250 and the first Velcro® member 510 and may compensate for the height in the thickness direction (e.g., the z direction) of the first Velcro® member 510. The height compensation member 530 may have a height sufficient to stably fasten the first Velcro® member 510 to the second Velcro® member 520 when the front cover 211 is fastened to the rear cover 212. However, this is merely an example, and the location of the height compensation member 530 is not limited thereto. For example, the height compensation member 530 may be arranged between the rear cover 212 and the second Velcro® member 520.

In an embodiment, referring to FIG. 4, when the rear cover 212 is fastened to the front cover 211, the first Velcro® member 510 may be fastened to the second Velcro® member 520. For example, the first Velcro® member 510 and the second Velcro® member 520 may be substantially arranged near the central portion of the rear cover 212. For example, the first Velcro® member 510 may be substantially arranged near the periphery of the PCB 250. According to the structure described above, since the first Velcro® member 510 is fastened to the second Velcro® member 520, at least a portion (e.g., the central portion) of the rear cover 212 may be less pressed or less pop out in the thickness direction (e.g., the z direction) of the rear cover 212.

In addition, the first Velcro® member 510, the second Velcro® member 520, and the height compensation member 530 illustrated in FIG. 4 are merely examples and one of ordinary skill in the art may clearly understand that the first Velcro® member 510, the second Velcro® member 520, and the height compensation member 530 may apply to the structure illustrated in FIGS. 2A to 2H and 3A to 3I.

According to embodiments, the electronic device 200 may include the first housing 210 including the front cover 211 and the rear cover 212 configured to fasten to the front cover 211, the second housing 220 connected to the display 221 and rotatably connected to the first housing 210, a PCB 250' arranged inside the first housing 210, the first fastening structure 300 arranged in the PCB 250', and the second fastening structure 400 arranged inside the rear cover 212 to be fastened to the first fastening structure 300, wherein the first fastening structure 300 may include the fixing member 310 fixedly connected to the PCB 250', the rotation hook 320 rotatably connected to the fixing member 310 and configured to fasten to the second fastening structure 400, and the elastic member 330 having a first end connected to the fixing member 310 and second end connected to the rotation hook 320, and wherein the elastic member 330 may generate a torque that rotates the rotation hook 320 relative to the fixing member 310 in a first direction or a second direction based on a fastening state of the second fastening structure 400 to the rotation hook 320.

According to embodiments, before the second fastening structure 400 is fastened to the rotation hook 320, the elastic member 330 may generate a torque $T_1$ that rotates the rotation hook 320 in the first direction, and when the second fastening structure 400 is fastened to the rotation hook 320, the elastic member 330 may generate a torque $T_2$ that rotates the rotation hook 320 in the second direction, and the second direction may be a direction in which a fastening force between the second fastening structure 400 and the rotation hook 320 increases.

According to embodiments, the fixing member 310 may include the bracket part 311 configured to provide a rotation space in which the rotation hook 320 rotates, and the fixing part 312 configured to fix the bracket part 311 to the PCB 250'.

According to embodiments, the bracket part 311 may include the first bracket body 3111 connected to the fixing part 312, a pair of second bracket bodies 3112 respectively bent and extending from both sides of the first bracket body 3111, and a pair of rotation hook insertion holes 3113 included in the pair of second bracket bodies 3112.

According to embodiments, the rotation hook 320 may include the first main body 321, the first hook 322 bent and extending from the central portion of the first main body 321, and the pair of rotating parts 323 included on both sides of the first main body 321 and configured to be inserted into the pair of rotation hook insertion holes 3113, respectively.

According to embodiments, the bracket part 311 may further include the first elastic member connection hole 3114 included in the first bracket body 3111, and the rotation hook 320 may further include the second elastic member connection hole 324 included in the first main body 321.

According to embodiments, the bracket part 311 may further include the stopper 3115 bent and extending from the central portion of the first bracket body 3111.

According to embodiments, before the second fastening structure 400 is fastened to the rotation hook 320, the rotation hook 320 may be arranged such that the first hook 322 contacts the stopper 3115 and the elastic member 330 may generate the torque $T_1$ that rotates the rotation hook 320 in the first direction, and the first direction may be a direction in which the first hook 322 presses the stopper 3115.

According to embodiments, while the second fastening structure 400 is fastened to the rotation hook 320, the second fastening structure 400 may rotate the rotation hook 320 in the second direction by pressing the first main body 321.

According to embodiments, when the second fastening structure 400 is fastened to the rotation hook 320, the elastic member 330 may generate the torque $T_2$ that rotates the rotation hook 320 in the second direction, and the second direction may be a direction in which a fastening force between the second fastening structure 400 and the rotation hook 320 increases.

According to embodiments, the fixing part 312 may include the fixing body 3121, the first fastening hole 3122 included in the fixing body 3121, and the guide protrusion 3123 protruding from the fixing body 3121.

According to embodiments, the first fastening structure 300 may be fixed to the PCB 250' through the fastening member 290.

According to embodiments, the second fastening structure 400 is fixed to the inner surface of the rear cover 212 through an adhesive member.

According to embodiments, the electronic device may further include the first Velcro® member 510 fixedly arranged inside the first housing 210, and the second Velcro® member 520 fixedly arranged in the rear cover 212 and configured to fasten to the first Velcro® member 510.

According to embodiments, the electronic device may further include the height compensation member 530 configured to compensate for a height in a thickness direction of the first Velcro® member 510 or the second Velcro® member 520.

According to embodiments, the electronic device 200 may include the housing including the front cover 211 and the rear cover 212 fastened to the front cover 211, the first fastening structure 300 arranged inside the housing, and the second fastening structure 400 arranged inside the rear cover 212 to be fastened to the first fastening structure 300, wherein the first fastening structure 300 may include the fixing member 310 fixedly arranged inside the housing, the rotation hook 320 rotatably connected to the fixing member 310 and configured to fasten to the second fastening structure 400, and the elastic member 330 having a first end connected to the fixing member 310 and a second end connected to the rotation hook 320, and wherein the elastic member 330 may generate a torque that rotates the rotation hook 320 relative to the fixing member 310 in a first direction or a second direction based on a fastening state of the second fastening structure 400 and the rotation hook 320.

According to embodiments, before the second fastening structure 400 is fastened to the rotation hook 320, the elastic member 330 may generate the torque $T_1$ in a direction in which the rotation hook 320 presses the stopper 3155 included in the fixing member 310.

According to embodiments, when the second fastening structure 400 is fastened to the rotation hook 320, the elastic member 330 may generate the torque $T_2$ in a direction in which a fastening force between the second fastening structure 400 and the rotation hook 320 increases.

According to embodiments, the second fastening structure 400 may be fixed to the inner surface of the rear cover 212 through an adhesive member.

According to embodiments, the electronic device 200 may include the first housing 210 including the front cover 211 and the rear cover 212 configured to fasten to the front cover 211, the second housing 220 connected to the display 221 and rotatably connected to the first housing 210, the PCB 250' arranged inside the first housing 210, the first fastening structure 300 arranged in the PCB 250', and the second fastening structure 400 arranged inside the rear cover 212 to be fastened to the first fastening structure 300, wherein the first fastening structure 300 may include the fixing member 310 fixedly connected to the PCB 250', the rotation hook 320 rotatably connected to the fixing member 310 and configured to fasten to the second fastening structure 400, and the elastic member 330 including a first end connected to the fixing member 310 and a second end connected to the rotation hook 320 and configured to generate a torque that rotates the rotation hook 320 in a first direction or a second direction relative to the fixing member 310 based on fastening state of the second fastening structure 400 to the rotation hook 320, wherein before the second fastening structure 400 is fastened to the rotation hook 320, the elastic member 330 may generate the torque $T_1$ in a direction in which the rotation hook 320 presses the stopper 3115 included in the fixing member 310, and when the second fastening structure 400 is fastened to the rotation hook 320, the elastic member 330 may generate the torque $T_2$ in a direction in which a fastening force between the second fastening structure 400 and the rotation hook 320 increases.

According to embodiments, wherein the elastic member may comprise at least one tension spring.

According to embodiments, wherein the elastic member may comprise a pair of springs, and wherein the pair of springs may be separately fixed between the first fastening structure and the second fastening structure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
- a first housing comprising a front cover and a rear cover, the rear cover being configured to fasten to the front cover;
- a second housing connected to a display and rotatably connected to the first housing;
- a printed circuit board (PCB) arranged inside the first housing;
- a first fastening structure arranged in the PCB; and
- a second fastening structure arranged inside the rear cover to be fastened to the first fastening structure, wherein the first fastening structure comprises:
- a fixing member fixedly connected to the PCB;
- a rotation hook rotatably connected to the fixing member and configured to fasten to the second fastening structure; and
- an elastic member having a first end connected to the fixing member and a second end connected to the rotation hook, and wherein the elastic member generates a torque that rotates the rotation hook relative to the fixing member in a first direction and a second direction, a direction in which the torque is generated being based on a fastening state of the second fastening structure to the rotation hook.

2. The electronic device of claim 1, wherein, before the second fastening structure is fastened to the rotation hook, the elastic member generates a torque that rotates the rotation hook in the first direction, wherein, when the second fastening structure is fastened to the rotation hook, the elastic member generates a torque that rotates the rotation hook in the second direction, and wherein the second direction is a direction in which a fastening force between the second fastening structure and the rotation hook increases.

3. The electronic device of claim 1, wherein the fixing member comprises:

a bracket part configured to provide a rotation space in which the rotation hook rotates; and a fixing part configured to fix the bracket part to the PCB.

4. The electronic device of claim 3, wherein the bracket part comprises:

a first bracket body connected to the fixing part;

a pair of second bracket bodies respectively bent and extending from both sides of the first bracket body; and a pair of rotation hook insertion holes comprised in the pair of second bracket bodies.

5. The electronic device of claim 4, wherein the rotation hook comprises:

a first main body;

a first hook bent and extending from a central portion of the first main body; and a pair of rotating parts comprised on both sides of the first main body and configured to be inserted into the pair of rotation hook insertion holes, respectively.

6. The electronic device of claim 5, wherein the bracket part further comprises a first elastic member connection hole comprised in the first bracket body, and wherein the rotation hook further comprises a second elastic member connection hole comprised in the first main body.

7. The electronic device of claim 6, wherein the bracket part further comprises a stopper bent and extending from a central portion of the first bracket body.

8. The electronic device of claim 7, wherein, before the second fastening structure is fastened to the rotation hook, the rotation hook is arranged such that the first hook contacts the stopper and the elastic member generates a torque that rotates the rotation hook in the first direction, and wherein the first direction is a direction in which the first hook presses the stopper.

9. The electronic device of claim 8, wherein, while the second fastening structure is fastened to the rotation hook, the second fastening structure rotates the rotation hook in the second direction by pressing the first main body.

10. The electronic device of claim 9, wherein, when the second fastening structure is fastened to the rotation hook, the elastic member generates a torque that rotates the rotation hook in the second direction, and wherein the second direction is a direction in which a fastening force between the second fastening structure and the rotation hook increases.

11. The electronic device of claim 3, wherein the fixing part comprises:

a fixing body;

a first fastening hole comprised in the fixing body; and a guide protrusion protruding from the fixing body.

12. The electronic device of claim 1, wherein the first fastening structure is fixed to the PCB through a fastening member.

13. The electronic device of claim 1, wherein the second fastening structure is fixed to an inner surface of the rear cover through an adhesive member.

14. The electronic device of claim 1, further comprising:

a first member fixedly arranged inside the first housing; and a second member fixedly arranged in the rear cover and configured to fasten to the first member.

15. The electronic device of claim 14, wherein a height compensation member configured to compensate for a height in a thickness direction of the first member or the second member.

16. An electronic device comprising:

a housing comprising a front cover and a rear cover fastened to the front cover;

a first fastening structure arranged inside the housing; and a second fastening structure arranged inside the rear cover to be fastened to the first fastening structure, wherein the first fastening structure comprises:

a fixing member fixedly arranged inside the housing;

a rotation hook rotatably connected to the fixing member and configured to fasten to the second fastening structure; and an elastic member having a first end connected to the fixing member and a second end connected to the rotation hook, and wherein the elastic member generates a torque that rotates the rotation hook relative to the fixing member in a first direction and a second direction, a direction in which the torque is generated being based on a fastening state of the second fastening structure and the rotation hook.

17. The electronic device of claim 16, wherein, before the second fastening structure is fastened to the rotation hook, the elastic member generates a torque in a direction in which the rotation hook presses a stopper comprised in the fixing member.

18. The electronic device of claim 16, wherein, when the second fastening structure is fastened to the rotation hook, the elastic member generates a torque in a direction in which a fastening force between the second fastening structure and the rotation hook increases.

19. The electronic device of claim 16, wherein the second fastening structure is fixed to an inner surface of the rear cover through an adhesive member.

20. An electronic device comprising:

a first housing comprising a front cover and a rear cover configured to fasten to the front cover;

a second housing connected to a display and rotatably connected to the first housing;

a printed circuit board (PCB) arranged inside the first housing;

a first fastening structure arranged in the PCB; and a second fastening structure arranged inside the rear cover to be fastened to the first fastening structure, wherein the first fastening structure comprises:

a fixing member fixedly connected to the PCB;

a rotation hook rotatably connected to the fixing member and configured to fasten to the second fastening structure; and an elastic member comprising a first end connected to the fixing member and a second end connected to the rotation hook and configured to generate a torque that rotates the rotation hook in a first direction and a second direction relative to the fixing member, a direction in which the torque is generated being based on fastening state of the second fastening structure to the rotation hook, wherein, before the second fastening structure is fastened to the rotation hook, the elastic member generates a torque in a direction in which the rotation hook presses a stopper comprised in the fixing member, and when the second fastening structure is fastened to the rotation hook, the elastic member generates a torque in a direction in which a fastening force between the second fastening structure and the rotation hook increases.

* * * * *